United States Patent
Takagi et al.

(10) Patent No.: US 10,857,630 B2
(45) Date of Patent: Dec. 8, 2020

(54) FLUX AND SOLDER PASTE

(71) Applicant: SENJU METAL INDUSTRY CO., LTD., Tokyo (JP)

(72) Inventors: Yoshinori Takagi, Tokyo (JP); Hiroyoshi Kawasaki, Tokyo (JP); Takahiro Nishizaki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/754,415

(22) PCT Filed: Oct. 10, 2018

(86) PCT No.: PCT/JP2018/037764
§ 371 (c)(1),
(2) Date: Apr. 8, 2020

(87) PCT Pub. No.: WO2019/074006
PCT Pub. Date: Apr. 18, 2019

(65) Prior Publication Data
US 2020/0316725 A1    Oct. 8, 2020

(30) Foreign Application Priority Data

Oct. 11, 2017  (JP) .................................. 2017-198018

(51) Int. Cl.
*B23K 35/362*       (2006.01)
*B23K 35/02*        (2006.01)

(52) U.S. Cl.
CPC .......... *B23K 35/362* (2013.01); *B23K 35/025* (2013.01)

(58) Field of Classification Search
None
See application file for complete search history.

(56) References Cited

U.S. PATENT DOCUMENTS

| 3,157,681 A | 11/1964 | Fischer |
| 2005/0230457 A1 | 10/2005 | Kay et al. |
| 2008/0135133 A1 | 6/2008 | Hagiwara |

FOREIGN PATENT DOCUMENTS

| JP | 2007532321 A | 11/2007 |
| JP | 2013169557 A | 9/2013 |
| JP | 2013173184 A | 9/2013 |
| JP | 2014185298 A | 10/2014 |
| JP | 2017064761 A | 4/2017 |
| JP | 2017088827 A | 5/2017 |
| WO | WO-2006025224 A1 | 3/2006 |

OTHER PUBLICATIONS

International Search Report (in English and Japanese) issued in PCT/JP2018/037764, dated Dec. 25, 2018; ISA/JP.

*Primary Examiner* — Jenny R Wu
(74) *Attorney, Agent, or Firm* — Harness, Dickey & Pierce, P.L.C.

(57) ABSTRACT

Provided are a flux having improved wetting and spreading properties and capable of suppressing the occurrence of dewetting and a solder paste using this flux. The flux includes a total amount of 0.5 wt % or more and 20 wt % or less of: any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid. The solder paste includes this flux and a metal powder.

18 Claims, 4 Drawing Sheets

FLUX AND SOLDER PASTE

CROSS-REFERENCE TO RELATED APPLICATIONS

This application is the U.S. National Phase Application under 35 U.S.C. 371 of International Application No. PCT/JP2018/037764, filed on Oct. 10, 2018, which claims the benefit of priority from Japanese Patent Application No. 2017-198018, filed on Oct. 11, 2017. The above applications are incorporated herein by reference in their entirety.

TECHNICAL FIELD

The present invention relates to a flux used for soldering and a solder paste using the flux.

BACKGROUND ART

Generally, a flux used for soldering chemically removes a metal oxide present on a solder and the metal surface of a joining object to be soldered, and has the effect of enabling a metal element to move in the boundary between the both. Thus, soldering using the flux can form an intermetallic compound between the solder and the metal surface of the joining object to provide a strong joining.

In conventional fluxes, an organic acid such as dicarboxylic acid has been used as an activator for chemically removing metal oxides. On the other hand, a technique using a dimer acid obtained by dimerizing oleic acid as an activator in a flux has been proposed (for example, refer to PTL 1).

CITATION LIST

Patent Literature

PTL 1: International Publication No. WO2006-025224

SUMMARY OF INVENTION

Technical Problem

A dimer acid is a dicarboxylic acid obtained by dimerizing a monocarboxylic acid and various monocarboxylic acids are present, and hence properties of the dimer acid vary greatly depending on the number of carbon atoms, degree of unsaturation (number of double bonds), and structure thereof. Thereby, for example, even at the same number of carbon atoms, the dimer acid structure becomes completely different due to the difference in the degree of unsaturation.

For this reason, the finish after mounting, for example, the wetting and spreading properties and the presence or absence of poor wetting (dewetting) may be completely different depending on the difference in the heat history in soldering. Therefore, a flux allowing stable and good-finish soldering through any heat history is required.

The present invention has been made to solve such problems, and an object of the present invention is to provide a flux having improved wetting and spreading properties and capable of suppressing the occurrence of dewetting, and a solder paste using the flux.

Solution to Problem

It has been found that soldering is performed by using a flux including a dimer acid obtained by dimerizing oleic acid and linoleic acid or a trimer acid obtained by trimerizing oleic acid and linoleic acid and thereby a solder wets and spreads well and the occurrence of dewetting can be suppressed.

The present invention is a flux including a total amount of 0.5 wt % or more and 20 wt % or less of only any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or only two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid.

The flux of the present invention preferably further includes 30 wt % or more and 60 wt % or less of a rosin and 29 wt % or more and 60 wt % or less of a solvent. The flux of the present invention preferably further includes 0 wt % or more and 10 wt % or less of an organic acid, 0 wt % or more and 5 wt % or less of an organic halogen compound, and 0 wt % or more and 5 wt % or less of an amine hydrohalide salt, as an activator. The flux of the present invention preferably further includes 0 wt % or more and 10 wt % or less of an amine as an activator. The amine is preferably included at 0.1 wt % or more and 10 wt % or less, and more preferably at 0.5 wt % or more and 10 wt % or less. The flux of the present invention preferably further includes 0 wt % or more and 10 wt % or less of a thixotropic agent.

Furthermore, the present invention is a solder paste including the above flux and metal powder.

Advantageous Effects of Invention

In the present invention, any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid are included in a predetermined amount, exhibiting good wetting and spreading even under conditions of large heat load and allowing the occurrence of dewetting to be suppressed.

DESCRIPTION OF EMBODIMENTS

An Example of the Flux of the Present Embodiment

A flux of the present embodiment includes a total amount of 0.5 wt % or more and 20 wt % or less of any of a dimer acid which is a reaction product of oleic acid and linoleic acid, a trimer acid which is a reaction product of oleic acid and linoleic acid, a hydrogenated dimer acid which is a hydrogenated product obtained by adding hydrogen to a dimer acid which is a reaction product of oleic acid and linoleic acid, or a hydrogenated trimer acid which is a hydrogenated product obtained by adding hydrogen to a trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid.

The dimer acid of the present embodiment is a reaction product of oleic acid and linoleic acid, and is a dimer having 36 carbon atoms. In addition, the trimer acid of the present embodiment is a reaction product of oleic acid and linoleic acid, and is a trimer having 54 carbon atoms. The dimer acid and the trimer acid of the present embodiment, which are a reaction product of oleic acid and linoleic acid, have heat resistance in a temperature range assumed for soldering and function as an activator in soldering.

In addition, the flux of the present embodiment further includes 30 wt % or more and 60 wt % or less of a rosin and 29 wt % or more and 60 wt % or less of a solvent. The flux of the present embodiment further includes 0 wt % or more and 10 wt % or less of an organic acid, 0 wt % or more and 10 wt % or less of an amine, 0 wt % or more and 5 wt % or less of an organic halogen compound, 0 wt % or more and 5 wt % or less of an amine hydrohalide salt, as an activator. The flux of the present embodiment further includes 0 wt % or more and 10 wt % or less of a thixotropic agent.

Examples of the rosin include raw rosins such as a gum rosin, a wood rosin, and a tall oil rosin, and a derivative obtained from the raw rosin. Examples of the derivative include: a purified rosin, a hydrogenated rosin, a disproportionated rosin, a polymerized rosin, an acid-modified rosin, a phenol-modified rosin, and a α,β-unsaturated carboxylic acid-modified product (acrylated rosin, maleated rosin, fumarated rosin, etc.); a purified product, a hydrogenated product, and a disproportionated product of the polymerized rosin; and a purified product, a hydrogenated product, and a disproportionated product of the α,β-unsaturated carboxylic acid-modified product, and one or two or more of these may be used.

Examples of the organic acid include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, p-hydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl) propionic acid, 2,2-bis(hydroxymethyl) butanoic acid, 2,3-dihydroxybenzoic acid, 2,4-diethyl glutaric acid, 2-quinolinecarboxylic acid, 3-hydroxybenzoic acid, malic acid, p-anisic acid, stearic acid, 12-hydroxystearic acid, oleic acid, linoleic acid, and linolenic acid. In addition, for the organic acid, examples of a dimer acid other than the reaction product of oleic acid and linoleic acid, a trimer acid other than the reaction product of oleic acid and linoleic acid, a hydrogenated dimer acid obtained by adding hydrogen to the dimer acid other than the reaction product of oleic acid and linoleic acid, or a hydrogenated trimer acid obtained by adding hydrogen to the trimer acid other than the reaction product of oleic acid and linoleic acid include a dimer acid which is a reaction product of acrylic acid, a trimer acid which is a reaction product of acrylic acid, a dimer acid which is a reaction product of methacrylic acid, a trimer acid which is a reaction product of methacrylic acid, a dimer acid which is a reaction product of acrylic acid and methacrylic acid, a trimer acid which is a reaction product of acrylic acid and methacrylic acid, a dimer acid which is a reaction product of oleic acid, a trimer acid which is a reaction product of oleic acid, a dimer acid which is a reaction product of linoleic acid, a trimer acid which is a reaction product of linoleic acid, a dimer acid which is a reaction product of linolenic acid, a trimer acid which is a reaction product of linolenic acid, a dimer acid which is a reaction product of acrylic acid and oleic acid, a trimer acid which is a reaction product of acrylic acid and oleic acid, a dimer acid which is a reaction product of acrylic acid and linoleic acid, a trimer acid which is a reaction product of acrylic acid and linoleic acid, a dimer acid which is a reaction product of acrylic acid and linolenic acid, a trimer acid which is a reaction product of acrylic acid and linolenic acid, a dimer acid which is a reaction product of methacrylic acid and oleic acid, a trimer acid which is a reaction product of methacrylic acid and oleic acid, a dimer acid which is a reaction product of methacrylic acid and linoleic acid, a trimer acid which is a reaction product of methacrylic acid and linoleic acid, a dimer acid which is a reaction product of methacrylic acid and linolenic acid, a trimer acid which is a reaction product of methacrylic acid and linolenic acid, a dimer acid which is a reaction product of oleic acid and linolenic acid, a trimer acid which is a reaction product of oleic acid and linolenic acid, a dimer acid which is a reaction product of linoleic acid and linolenic acid, a trimer acid which is a reaction product of linoleic acid and linolenic acid, a hydrogenated dimer acid obtained by adding hydrogen to the above dimer acid other than the reaction product of oleic acid and linoleic acid, and a hydrogenated trimer acid obtained by adding hydrogen to the trimer acid other than the reaction product of oleic acid and linoleic acid.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, and 5-phenyltetrazole.

Examples of the organic halogen compound include trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

The amine hydrohalide salt is a compound obtained by reacting an amine with hydrogen halide, and examples thereof include aniline hydrogen chloride and aniline hydrogen bromide. As the amine of the amine hydrohalide, the above amine may be used, and examples thereof include ethylamine, ethylenediamine, triethylamine, methylimidazole, and 2-ethyl-4-methylimidazole, and examples of the hydrogen halide include hydrogenated products of chlorine, bromine, iodine, and fluorine (hydrogen chloride, hydrogen bromide, hydrogen iodide, and hydrogen fluoride). Furthermore, a borofluoride may be included in place of the amine hydrohalide salt or in combination with the amine hydrohalide salt, and examples of the borofluoride include fluoroboric acid.

Examples of the solvent include water, an alcohol solvent, a glycol ether solvent, and terpineols. Examples of the alcohol solvent include isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, and 2,4,7,9-tetramethyl-5-decyne-4,7-diol. Examples of the glycol ether solvent include hexyldiglycol, diethylene glycol mono-2-ethylhexyl ether, ethylene glycol monophenyl ether, 2-methylpentane-2,4-diol, diethylene glycol monohexyl ether, diethylene glycol dibutyl ether, and triethylene glycol monobutyl ether.

Examples of the thixotropic agent include a wax thixotropic agent and an amide thixotropic agent. Examples of the wax thixotropic agent include hydrogenated castor oil. Examples of the amide thixotropic agent include a lauramide, a palmitamide, a stearamide, a behenamide, a hydroxystearamide, a saturated fatty acid amide, an oleamide, an erucic acid amide, an unsaturated fatty acid amide, a p-toluene methane amide, an aromatic amide, a methylene bisstearamide, an ethylene bislauramide, an ethylene bishydroxystearamide, a saturated fatty acid bisamide, a methylenebisoleamide, an unsaturated fatty acid bisamide, a m-xylylenebisstearamide, an aromatic bisamide, a saturated fatty acid polyamide, an unsaturated fatty acid polyamide, an aromatic polyamide, a substituted amide, a methylol stearamide, a methylol amide, and a fatty acid ester amide.

An Example of Solder Paste of the Present Embodiment

The solder paste of the present embodiment includes the above flux and metal powder. The metal powder is preferably a Pb-free solder, and is composed of a simple substance of Sn, alloys such as Sn—Ag-based alloy, Sn—Cu-based alloy, Sn—Ag—Cu-based alloy, Sn—Bi-based alloy, and Sn—In-based alloy, or solder powder obtained by adding Sb, Bi, In, Cu, Zn, As, Ag, Cd, Fe, Ni, Co, Au, Ge, P or the like to those alloys.

Examples of Effects of Flux and Solder Paste of the Present Embodiment

For a flux including a total amount of 0.5 wt % or more and 20 wt % or less of: any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and for solder paste using this flux, the dimer acid and the trimer acid of the present embodiment, which are reaction products of oleic acid and linoleic acid, have heat resistance in a temperature range assumed for soldering and function as an activator in soldering. Thereby, even under reflow conditions with a large thermal load, the solder wets and spreads well, and the occurrence of poor wetting (dewetting) of the solder can be suppressed.

Examples of an organic acid having heat resistance include an aromatic organic acid. The aromatic organic acid has heat resistance, but its activity as a flux is originally low and hence the amount added is inevitably increased. For example, the following problem occurs: the acid tends to remain as residue, worsening the cleaning property or causing precipitation.

On the other hand, when the dimer acid and trimer acid which are reaction products of oleic acid and linoleic acid and a hydrogenated product thereof of the present embodiment are used, both heat resistance and activity can be achieved and the amount added as an activator can be reduced, which can reduce the residue to improve the cleaning property. These physical properties can be further enhanced by using an amine in combination.

EXAMPLES

The fluxes of Examples and Comparative Examples were prepared with the compositions set forth in the following Table 1 and Table 2, these fluxes are used to prepare solder paste, and the quality of wetting and spreading of the solder and the quality of suppressing poor wetting (dewetting) of the solder were investigated. The composition ratios in Table 1 and Table 2 are wt % (% by weight) when the total amount of the flux is 100.

The solder paste has a flux of 11 wt % and a metal powder of 89 wt %. In addition, the metal powder in the solder paste is a Sn—Ag—Cu-based solder alloy with 3.0 wt % of Ag, 0.5 wt % of Cu, and the balance of Sn, and the average particle size of the metal powder is ϕ20 µm.

<Evaluation of Wetting and Spreading of Solder>
(1) Investigation Method

In evaluation test of wetting and spreading of the solder, a solder paste obtained by mixing the metal powder described above with the flux described in each Example and each Comparative Example is printed on a Bare-Cu plate of 50 mm long×50 mm wide×0.5 mm thick by using a stainless steel mask on which a printing part of the solder paste was formed in a predetermined pattern described in JIS Z 3284-3.

The printing part provided in the mask is a square opening, and the size is 3.0 mm×1.5 mm. In the printing part, a plurality of openings with the same size are arranged at different intervals, and the intervals between the openings are 0.2, 0.3, 0.4, 0.5, 0.6, 0.7, 0.8, 0.9, 1.0, 1.1, and 1.2 mm.

After printing the solder paste, the mask is removed, and it is confirmed before reflow that the solder paste is not in contact at the minimum spacing of 0.2 mm between the parallel printing parts, and then reflow is performed. The reflow condition is such that preheating is performed for 120 seconds at 190° C. under air atmosphere and then main heating is performed by increasing the temperature from 190° C. to 260° C. at a temperature rising rate of 1° C./sec.

(2) Criteria

Figure 1A:
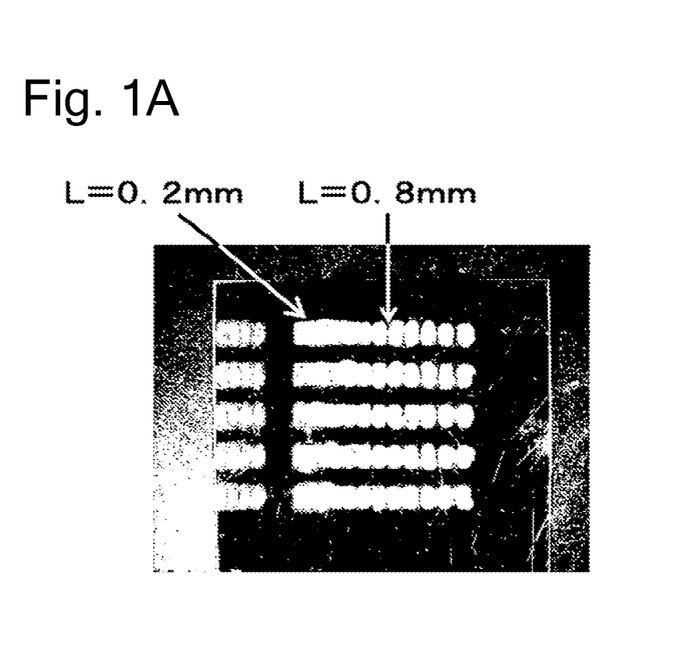
FIG. 1A is an explanatory diagram showing evaluation results of wetting and spreading of a solder.
Figure 1B:
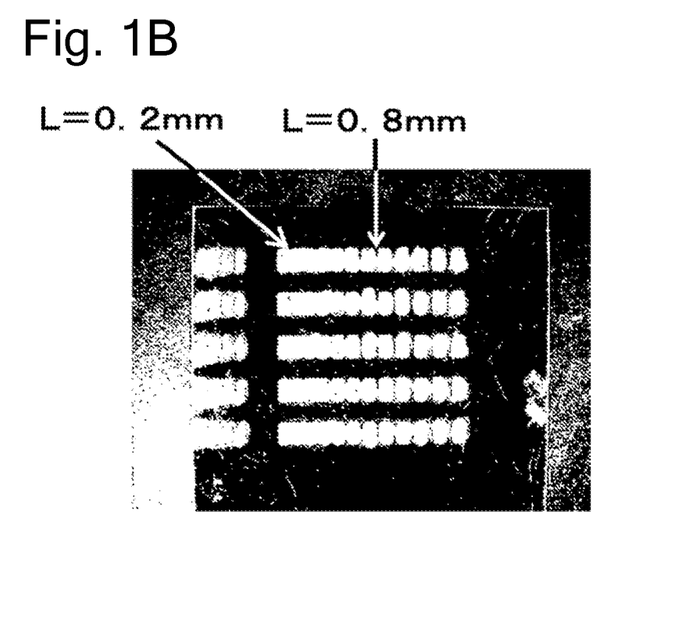
FIG. 1B is an explanatory diagram showing evaluation results of wetting and spreading of a solder.
Figure 1C:
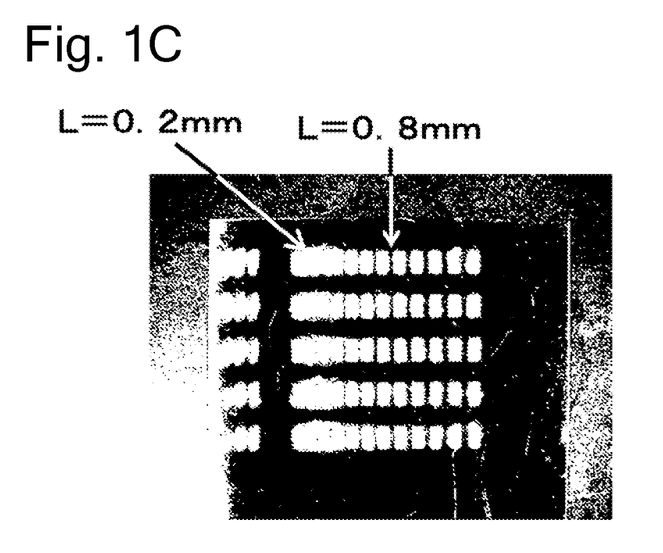
FIG. 1C is an explanatory diagram showing evaluation results of wetting and spreading of a solder.
Figure 1D:
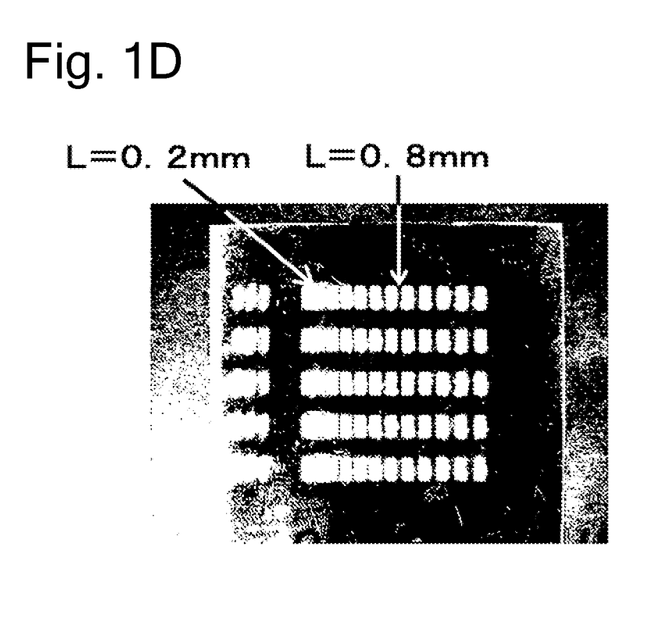
FIG. 1D is an explanatory diagram showing evaluation results of wetting and spreading of a solder.

FIG. 1A, FIG. 1B, FIG. 1C, and FIG. 1D are explanatory diagrams showing the evaluation results of wetting and spreading of the solder. The above predetermined interval at which the printed solder pastes had been wetted and spread after reflow and contact with each other to be merged together is confirmed. At N=4, ◯: Merge at all of interval L of 0.8 mm or less x: No merge at at least one of interval L of 0.8 mm or less FIG. 1A shows a result when the flux of Example 1 is used, FIG. 1B shows a result when the flux of Example 3 is used, FIG. 1C shows a result when the flux of Comparative Example 1 is used, and FIG. 1D shows a result when the flux of Comparative Example 2 is used.

<Evaluation of Dewetting Suppression of Solder>
(1) Investigation Method

In evaluation test of dewetting suppression of the solder, a solder paste obtained by mixing the metal powder described above with the flux described in each Example and each Comparative Example was printed on a Cu-OSP land of 0.8 mm long×0.8 mm wide to perform reflow. The print thickness of the solder paste is 0.12 mm. The reflow condition is such that preheating is performed for 120 seconds at 190° C. under air atmosphere and then main heating is performed by increasing the temperature from 190° C. to 260° C. at a temperature rising rate of 1° C./sec.

(2) Criteria

FIG. 2A, FIG. 2B, FIG. 2C, and FIG. 2D are explanatory diagrams showing the evaluation results of dewetting suppression of the solder. The presence or absence of the occurrence of dewetting Dw was observed after reflow by using an optical microscope.

At N=12,

◯: All portions to which the solder composition had been applied are wet with the solder.

x: Most of the portions to which the solder composition had been applied are wet with solder (dewetting in some cases) and poor wetting occurred. Otherwise, there is no appearance of solder wet, and the molten solder is in a state of one or more solder balls (non-wetting).

Figure 2A:
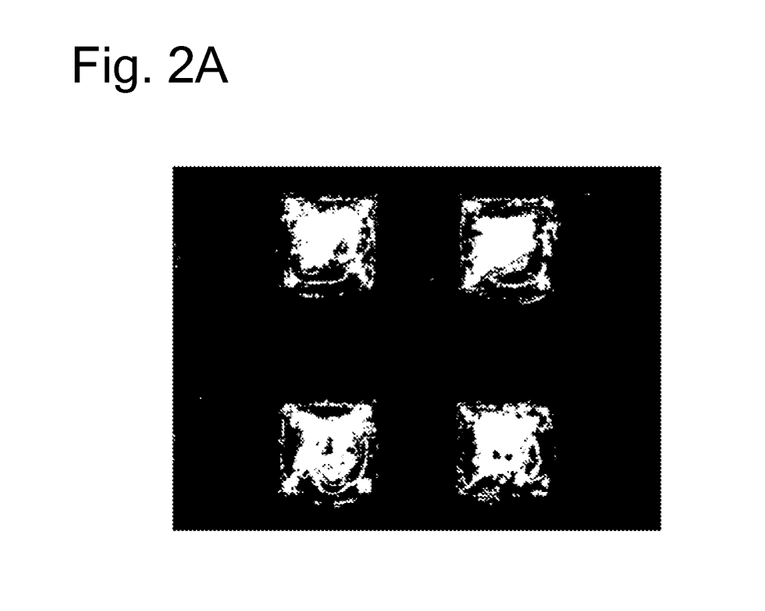
FIG. 2A is an explanatory diagram showing evaluation results of dewetting suppression of a solder.
Figure 2B:
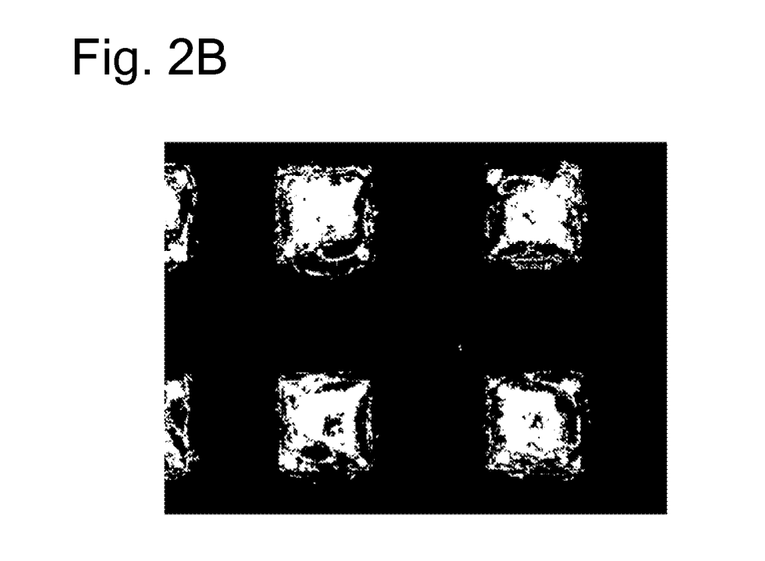
FIG. 2B is an explanatory diagram showing evaluation results of dewetting suppression of a solder.
Figure 2C:
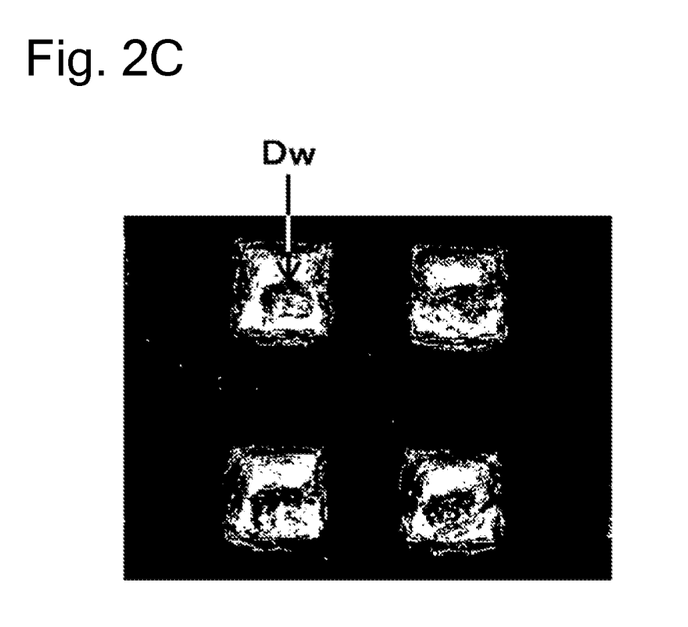
FIG. 2C is an explanatory diagram showing evaluation results of dewetting suppression of a solder.
Figure 2D:
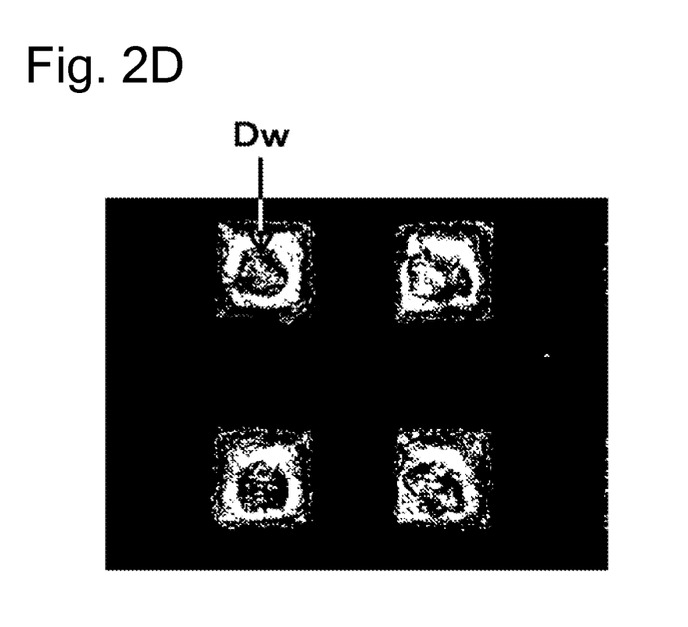
FIG. 2D is an explanatory diagram showing evaluation results of dewetting suppression of a solder.

FIG. 2A shows a result when the flux of Example 1 is used, FIG. 2B shows a result when the flux of Example 3 is used, FIG. 2C shows a result when the flux of Comparative Example 1 is used, and FIG. 2D shows a result when the flux of Comparative Example 2 is used.

TABLE 1

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Resin | Polymerized resin | 45 | 45 | 45 | 45 | 45 |  |  | 25 | 45 | 45 | 45 | 45 | 45 |
|  | Hydrogenated resin |  |  |  |  |  | 45 |  |  |  |  |  |  |  |
|  | Acid-modified resin |  |  |  |  |  |  | 45 | 20 |  |  |  |  |  |
| Organic acid | Glutaric acid |  |  |  |  |  |  |  |  |  |  |  |  | 5 |
|  | Adipic acid |  |  |  |  |  |  |  |  |  |  |  |  |  |
| Dimer which is a reaction product of oleic acid and linoleic acid | Dimer acid | 5 |  |  |  | 1.25 | 5 | 5 | 5 | 20 | 20 | 20 | 5 | 0.5 |
|  | Hydrogenated dimer acid |  |  | 5 |  | 1.25 |  |  |  |  |  |  |  |  |

TABLE 1-continued

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Trimer which is a reaction product of oleic acid and linoleic acid | Trimer acid | | | 5 | | 1.25 | | | | | | | | |
| | Hydrogenated trimer acid | | | | 5 | 1.25 | | | | | | | | |
| Amine | Monoethanolamine | 5 | 5 | 5 | 5 | 5 | 5 | 5 | 5 | 0 | 0.1 | 0.5 | 10 | 10 |
| | Diphenylguanidine | | | | | | | | | | | | | |
| | 2-Phenylimidazole | | | | | | | | | | | | | |
| | 2-Phenyl-4-methylimidazole | | | | | | | | | | | | | |
| Organic halogen compound | trans-2,3-Dibromo-1,4-butenediol | 1 | 1 | 1 | 1 | 1 | 1 | 1 | 1 | 1 | 1 | 1 | 1 | 1 |
| | Triallyl isocyanurate hexabromide | | | | | | | | | | | | | |
| Amine hydrohalide salt | Aniline-HCl | | | | | | | | | | | | | |
| | Aniline-HBr | | | | | | | | | | | | | |
| Solvent | Hexyldiglycol | 39 | 39 | 39 | 39 | 39 | 39 | 39 | 39 | 29 | 28.9 | 28.5 | 34 | 33.5 |
| Thixotropic agent | Hydrogenated castor oil | 5 | 5 | 5 | 5 | 5 | 5 | 5 | 5 | 5 | 5 | 5 | 5 | 5 |
| Wetting and spreading properties | | ○ | ○ | ○ | ○ | ○ | ○ | ○ | ○ | ○ | ○ | ○ | ○ | ○ |
| Dewetting suppression | | ○ | ○ | ○ | ○ | ○ | ○ | ○ | ○ | ○ | ○ | ○ | ○ | ○ |

TABLE 2

| | | Example 14 | Example 15 | Example 16 | Example 17 | Example 18 | Example 19 | Example 20 | Example 21 | Example 22 | Example 23 | Comparative Example 1 | Comparative Example 2 |
|---|---|---|---|---|---|---|---|---|---|---|---|---|---|
| Resin | Polymerized resin | 45 | 45 | 45 | 45 | 45 | 45 | 45 | 45 | 45 | 45 | 45 | 45 |
| | Hydrogenated resin | | | | | | | | | | | | |
| | Acid-modified resin | | | | | | | | | | | | |
| Organic acid | Glutaric acid | 5 | 5 | 5 | 10 | | 5 | 5 | 5 | 5 | 5 | 5 | |
| | Adipic acid | | | | | 5 | | | | | | | 5 |
| Dimer which is a reaction product of oleic acid and linoleic acid | Dimer acid | 5 | 5 | 5 | 5 | 5 | 5 | 5 | 5 | 5 | 5 | | |
| | Hydrogenated dimer acid | | | | | | | | | | | | |
| Trimer which is a reaction product of oleic acid and linoleic acid | Trimer acid | | | | | | | | | | | | |
| | Hydrogenated trimer acid | | | | | | | | | | | | |
| Amine | Monoethanolamine | | | | | | 5 | 5 | 5 | 5 | 5 | 5 | 5 |
| | Diphenylguanidine | 2 | | | | | | | | | | | |
| | 2-Phenylimidazole | | 2 | | | | | | | | | | |
| | 2-Phenyl-4-methylimidazole | | | 2 | | | | | | | | | |
| Organic halogen compound | trans-2,3-Dibromo-1,4-butenediol | 1 | 1 | 1 | 1 | 1 | 0 | 5 | | | | 1 | 1 |
| | Triallyl isocyanurate hexabromide | | | | | | | | 1 | | | | |
| Amine hydrohalide salt | Aniline-HCl | | | | | | | | | 1 | | | |
| | Aniline-HBr | | | | | | | | | | 5 | | |
| Solvent | Hexyldiglycol | 37 | 37 | 37 | 34 | 39 | 35 | 30 | 34 | 34 | 30 | 39 | 39 |
| Thixotropic agent | Hydrogenated castor oil | 5 | 5 | 5 | 5 | 5 | 5 | 5 | 5 | 5 | 5 | 5 | 5 |
| Wetting and spreading properties | | ○ | ○ | ○ | ○ | ○ | ○ | ○ | ○ | ○ | ○ | x | x |
| Dewetting suppression | | ○ | ○ | ○ | ○ | ○ | ○ | ○ | ○ | ○ | ○ | x | x |

In the present invention, as shown in Example 1 to Example 4, a flux including 5 wt % of any of a dimer acid which is a reaction product of oleic acid and linoleic acid, a trimer acid which is a reaction product of oleic acid and linoleic acid, a hydrogenated dimer acid obtained by adding hydrogen to the dimer acid which is a reaction product of oleic acid and linoleic acid, or a hydrogenated trimer acid obtained by adding hydrogen to the trimer acid which is a reaction product of oleic acid and linoleic acid had sufficient effect for wetting and spreading and dewetting suppression.

As shown in Example 5, 1.25 wt % of each of a dimer acid which is a reaction product of oleic acid and linoleic acid, a trimer acid which is a reaction product of oleic acid and linoleic acid, a hydrogenated dimer acid obtained by adding hydrogen to the dimer acid which is a reaction product of oleic acid and linoleic acid, and a hydrogenated trimer acid obtained by adding hydrogen to the trimer acid which is a reaction product of oleic acid and linoleic acid, 5 wt % in total, was included, also exhibiting sufficient effect for wetting and spreading and dewetting suppression. Two or more of a dimer acid which is a reaction product of oleic acid and linoleic acid, a trimer acid which is a reaction product of oleic acid and linoleic acid, a hydrogenated dimer acid obtained by adding hydrogen to the dimer acid which is a reaction product of oleic acid and linoleic acid, and a hydrogenated trimer acid obtained by adding hydrogen to the trimer acid which is a reaction product of oleic acid and linoleic acid, 5 wt % in total, were included, also exhibiting sufficient effect for wetting and spreading and dewetting suppression.

In contrast, as shown in Comparative Example 1 and Comparative Example 2, a flux including none of a dimer acid which is a reaction product of oleic acid and linoleic acid, a trimer acid which is a reaction product of oleic acid and linoleic acid, a hydrogenated dimer acid obtained by adding hydrogen to the dimer acid which is a reaction product of oleic acid and linoleic acid, and a hydrogenated trimer acid obtained by adding hydrogen to the trimer acid which is a reaction product of oleic acid and linoleic acid had no sufficient effect for wetting and spreading and dewetting suppression, even when an organic acid and amine were included in a predetermined amount prescribed in the present invention.

In addition, a rosin was included in the range prescribed in the present invention, exhibiting the effect of wetting and spreading and dewetting suppression, and as shown in Example 6 to Example 8, a type of the rosin was changed or a plurality of types of the rosin was combined, also exhibiting the effect of wetting and spreading and dewetting suppression.

Furthermore, an amine was included in the range prescribed in the present invention, exhibiting the effect of wetting and spreading and dewetting suppression, and as shown in Example 9 to Example 11, 20 wt % of a dimer acid which is a reaction product of oleic acid and linoleic acid was included, exhibiting the effect of wetting and spreading and dewetting suppression even when an amine was reduced in the range prescribed in the present invention, and as shown in Example 9, no amine was included, also exhibiting the effect of wetting and spreading and dewetting suppression.

In contrast, as shown in Example 12, 5 wt % of a dimer acid which is a reaction product of oleic acid and linoleic acid and 10 wt % of an amine were included, also exhibiting the effect of wetting and spreading and dewetting suppression. In addition, as shown in Example 13, 0.5 wt % of a dimer acid which is a reaction product of oleic acid and linoleic acid and 10 wt % of an amine were included, also exhibiting the effect of wetting and spreading and dewetting suppression. Furthermore, as shown in Example 14 to Example 16, a type of the amine was changed, also exhibiting the effect of wetting and spreading and dewetting suppression. As shown in Example 9, no amine was included, also exhibiting the effect of wetting and spreading and dewetting suppression, and preferably 0.1 wt % or more and 10 wt % or less of an amine, more preferably 0.5 wt % or more and 10 wt % or less of an amine were included, exhibiting the effect of wetting and spreading and dewetting suppression while suppressing the amount of a dimer acid added which is a reaction product of oleic acid and linoleic acid.

In addition, an organic acid was included in the range prescribed in the present invention, exhibiting the effect of wetting and spreading and dewetting suppression, and as shown in Example 17, 10 wt % of the organic acid was included, also exhibiting the effect of wetting and spreading and dewetting suppression, and as shown in Example 18, a type of the organic acid was changed, also exhibiting the effect of wetting and spreading and dewetting suppression.

Furthermore, an organic halogen compound was included in the range prescribed in the present invention, exhibiting the effect of wetting and spreading and dewetting suppression, and as shown in Example 19, no organic halogen compound was included, also exhibiting the effect of wetting and spreading and dewetting suppression, and as shown in Example 20, 5 wt % of the organic halogen compound was included, also exhibiting the effect of wetting and spreading and dewetting suppression. In addition, as shown in Example 21, a type of the organic halogen compound was changed, also exhibiting the effect of wetting and spreading and dewetting suppression.

Furthermore, an amine hydrohalide salt was included in the range prescribed in the present invention, exhibiting the effect of wetting and spreading and dewetting suppression, and as shown in Example 22, 1 wt % of the amine hydrohalide salt was included, also exhibiting the effect of wetting and spreading and dewetting suppression, and as shown in Example 23, 5 wt % of the amine hydrohalide salt was included, also exhibiting the effect of wetting and spreading and dewetting suppression.

As a result, for a flux including 0.5 wt % or more and 20 wt % or less of any of a dimer acid which is a reaction product of oleic acid and linoleic acid, a trimer acid which is a reaction product of oleic acid and linoleic acid, a hydrogenated dimer acid obtained by adding hydrogen to the dimer acid which is a reaction product of oleic acid and linoleic acid, or a hydrogenated trimer acid obtained by adding hydrogen to the trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to the dimer acid which is a reaction product of oleic acid and linoleic acid, and a hydrogenated trimer acid obtained by adding hydrogen to the trimer acid which is a reaction product of oleic acid and linoleic acid, 30 wt % or more and 60 wt % or less of a rosin, 0 wt % or more and 10 wt % or less of an organic acid, 0 wt % or more and 10 wt % or less of an amine, 0 wt % or more and 5 wt % or less of an organic halogen compound, 0 wt % or more and 5 wt % or less of an amine hydrohalide salt, 29 wt % or more and 60 wt % or less of a solvent, and 0 wt % or more and 10 wt % or less of a thixotropic agent, and for a solder paste using this flux, it is found that good wetting and spreading is exhibited even under conditions of large heat load and the occurrence of dewetting can be suppressed, and a flux allowing stable and good-finish soldering through any heat history can be provided.

The invention claimed is:
1. A flux comprising
a total amount of 0.5 wt % or more and 20 wt % or less of a dimer acid and/or a trimer acid,
wherein the dimer acid is selected from a dimer acid which is a reaction product of oleic acid and linoleic acid, a hydrogenated dimer acid obtained by adding hydrogen to a dimer acid which is a reaction product of oleic acid and linoleic acid, and a combination thereof, and the trimer acid is selected from a trimer acid which is a reaction product of oleic acid and linoleic acid, a hydrogenated trimer acid obtained by adding hydrogen to a trimer acid which is a reaction product of oleic acid and linoleic acid, and a combination thereof.

2. The flux according to claim 1, further comprising:
30 wt % or more and 60 wt % or less of a rosin; and
29 wt % or more and 60 wt % or less of a solvent.

3. The flux according to claim 1, further comprising:
0 wt % or more and 10 wt % or less of an organic acid;
0 wt % or more and 5 wt % or less of an organic halogen compound; and
0 wt % or more and 5 wt % or less of an amine hydrohalide salt, as an activator.

4. The flux according to claim 1, further comprising
0 wt % or more and 10 wt % or less of an amine as an activator.

5. The flux according to claim 1, further comprising
0 wt % or more and 10 wt % or less of a thixotropic agent.

6. The flux according to claim 4, comprising
0.1 wt % or more and 10 wt % or less of an amine.

7. The flux according to claim 4, comprising
0.5 wt % or more and 10 wt % or less of an amine.

8. A solder paste comprising
the flux according to claim 1 and a metal powder.

9. The flux according to claim 2, further comprising:
0 wt % or more and 10 wt % or less of an organic acid;
0 wt % or more and 5 wt % or less of an organic halogen compound; and
0 wt % or more and 5 wt % or less of an amine hydrohalide salt, as an activator.

10. The flux according to claim 2, further comprising
0 wt % or more and 10 wt % or less of an amine as an activator.

11. The flux according to claim 3, further comprising
0 wt % or more and 10 wt % or less of an amine as an activator.

12. The flux according to claim 2, further comprising
0 wt % or more and 10 wt % or less of a thixotropic agent.

13. The flux according to claim 3, further comprising
0 wt % or more and 10 wt % or less of a thixotropic agent.

14. The flux according to claim 4, further comprising
0 wt % or more and 10 wt % or less of a thixotropic agent.

15. A solder paste comprising
the flux according to claim 2 and a metal powder.

16. A solder paste comprising
the flux according to claim 3 and a metal powder.

17. A solder paste comprising
the flux according to claim 4 and a metal powder.

18. A solder paste comprising
the flux according to claim 5 and a metal powder.

* * * * *